(12) United States Patent
Sugata

(10) Patent No.: US 6,494,396 B2
(45) Date of Patent: Dec. 17, 2002

(54) CABLE REEL STRUCTURE

(75) Inventor: Shoichi Sugata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/860,504

(22) Filed: May 21, 2001

(65) Prior Publication Data

US 2001/0048044 A1 Dec. 6, 2001

(30) Foreign Application Priority Data

May 30, 2000 (JP) ........................................ 2000-160832

(51) Int. Cl.[7] .......................... B65H 75/38; H01R 39/02
(52) U.S. Cl. ....................... 242/388.5; 242/388; 439/15; 439/164
(58) Field of Search .............................. 242/388, 388.1, 242/388.5, 388.6, 397, 378, 378.4, 397.2, 615.1, 615.2, 615.4; 439/15, 164

(56) References Cited

U.S. PATENT DOCUMENTS

| | | | | |
|---|---|---|---|---|
| 5,046,951 A | * | 9/1991 | Suzuki | 439/15 |
| 5,102,061 A | * | 4/1992 | Suzuki et al. | 439/15 |
| 5,328,112 A | * | 7/1994 | Obata | 242/388 |
| 5,772,146 A | | 6/1998 | Kawamoto et al. | |
| 5,841,069 A | * | 11/1998 | Nagaoka et al. | 242/388 |
| 5,865,634 A | * | 2/1999 | Best | 439/15 |
| 5,975,931 A | * | 11/1999 | Ishikawa | 439/15 |
| 5,980,286 A | * | 11/1999 | Best et al. | 439/15 |
| 6,012,935 A | * | 1/2000 | Bolen et al. | 439/15 |
| 6,302,716 B1 | * | 10/2001 | Matsumoto et al. | 439/164 |
| 6,354,854 B1 | * | 3/2002 | Matsuzaki | 439/164 |

FOREIGN PATENT DOCUMENTS

| | | | | |
|---|---|---|---|---|
| JP | 5-226045 | * | 5/1993 | 439/15 |
| JP | 7-193955 | | 7/1995 | |

OTHER PUBLICATIONS

English Language Abstract of JP 7–193955.

* cited by examiner

Primary Examiner—William A. Rivera
(74) Attorney, Agent, or Firm—Greenblum & Bernstein, P.L.C.

(57) ABSTRACT

A cable guide is mounted into a cable reel structure, so as to form an inner enclosure and an outer enclosure. The cable guide is divided into at least two guide portions, so that, when the guides are assembled, the guides form at least two reverse path channels. At least one flat cable is spiraled in the inner enclosure in a first direction, passed through the reverse path channels, and spiraled in the outer enclosure in a second direction inverse to the first direction. In such a reverse-type cable reel structure, the flat cables can easily be passed through the reverse path channels, when the spiraling direction of the flat cable is reversed in the outer enclosure with respect to that in the inner enclosure.

8 Claims, 11 Drawing Sheets

CABLE REEL STRUCTURE

BACKGROUND OF THE INVENTION

1. Field of the Invention

The present invention generally pertains to a cable reel structure incorporated into a steering system of a vehicle e.g. an automobile. The cable reel structure of the invention is defined by a fixed member and a mobile member, and a cable enclosure formed between the same. The cable enclosure of the present invention contains a cable guide having e.g. a ring-shape with at least one cut-out portion, which partitions the cable enclosure into an inner cable enclosure and an outer cable enclosure along the radial direction of the cable reel structure. The cable enclosure further includes a flat cable, which is spiraled in the inner cable enclosure in a first circular direction, U-turned around the cut-out portion of the cable guide, and then spiraled in the outer cable enclosure in a second circular direction reversed with respect to the first circular direction. Such a structural configuration allows the cable reel structure to be mounted more efficiently than in the case of the prior art.

2. Description of Background Information

In a conventional cable reel construction, the fixed member of the cable reel structure forms an outer cylindrical wall and top guard of the cable reel, and is immobilized with a combination switch body, which is in turn fixed with a steering column. On the other hand, the mobile member forms an inner cylindrical wall and bottom guard of the cable reel, and is fixed with the steering wheel. The mobile member is then mounted with the fixed member in a freely rotatable manner, thereby forming a substantially torus-shaped enclosure, in which a spiraled flat cable is stored. One end of the flat cable is connected to the fixed member, and the other end is connected to the mobile member, so that an electrical current flow in the flat cable can be led out from the cable reel to external circuits. The mobile member is rotated clockwise or counter-clockwise in conjunction with the movement of the steering wheel, and the spiraled flat cable is wound or unwound accordingly.

Such a cable reel is already disclosed in Japanese Patent Application published under No. Hei 7-193 955. As shown in FIGS. 1A and 1B, the prior art cable reel includes a torus-shaped enclosure 3 formed by a fixed member 1 and a mobile member 2. The torus-shaped enclosure 3 then contains a cable guide 4 with a reverse path channel 4a (forming a C shape), thereby defining radially inner and outer enclosures. A flat cable 5 is first spiraled in the inner enclosure formed between the inner cylindrical wall of mobile member 2 and the cable guide 4, U-turned after being passed through the reverse path channel 4a, and then spiraled in the reverse direction in the outer enclosure formed between the cable guide 4 and the outer cylindrical wall of fixed member 1

In the above reverse-type cable reel, when the steering wheel is rotated e.g. clockwise, the flat cable 5 is led from the outer enclosure into the inner enclosure by making a U-turn at the reverse path channel 4a of the cable guide 4, and wound around the inner cylindrical wall of the mobile member 2. When the steering wheel is rotated counter-clockwise, the flat cable 5 makes a reverse movement, i.e. the flat cable 5 is led into the outer enclosure of the cable reel, and added to the spirals in the outer enclosure from inside.

Compared with the system with normally spiraled flat cable, the reverse-type flat cable can have a shorter length. Normally, at least the length equivalent to the part of flat cable inversely turned at the exit of the reverse path channel can be shortened. The length of the flat cable can thus be reduced to at least half the length in the normally spiraled case.

In the above construction, the winding direction of the flat cable must be reversed between the outer enclosure and the inner enclosure when it is passed through the reverse path channel 4a of the cable guide 4. Meanwhile, the reverse path channel 4a is oriented in the radial direction of the cable guide 4 as shown in FIG. 1B. Accordingly, for the flat cable to be brought through the reverse path channel 4a, the cable guide 4 must be mounted into the cable reel from the top thereof (FIG. 1B).

However, as the slit width of the reverse path channel 4a is quite narrow, the flat cable tends to abut against edges 4b and 4c of the cable guide 4. As the flat cable 5 is made of a flexible material and is mechanically vulnerable, such an abutment often damages the flat cable.

Further, as the cable guide 4 must be fitted with the flat cable 5 in the top-down, or bottom-up, direction in a limited space, operations are not easy to conduct.

SUMMARY OF THE INVENTION

The present invention has been contemplated to solve such problems. It provides a reversed-type cable reel, for which the structure is configured such that a cable guide can be fitted with a flat cable without causing damage to the latter.

To this end, there is provided a reverse-type cable reel structure configured to contain at least one flat cable and including a cable guide with at least one reverse path channel, the cable guide partitioning the cable reel structure into a radially inner enclosure and a radially outer enclosure. The at least one flat cable is first wound in the radially inner enclosure in a given winding direction, passed through the reverse path channel, inversely turned at the exit thereof, and wound in the radially outer enclosure in a direction reverse to the given winding direction.

The cable guide is then divided into at least first and second complementary guide portions, thereby forming at least first and second reverse path channels, such that the complementary guide portions can be mounted laterally over the at least one flat cable after the latter has been wound in the radially inner enclosure.

Preferably, the cable reel structure includes a fixed member including an outer cylindrical wall, and a mobile member including an inner cylindrical wall, mounted within the fixed member in a freely rotatable manner, thereby defining a cable enclosure having a torus-shaped hollow portion. The cable enclosure contains the cable guide having a ring shape, the cable guide partitions the cable enclosure into the radially inner and external enclosures communicating therebetween through the reverse path channel, and the at least one flat cable has a first end portion fixed to the mobile member and a second end portion fixed to the fixed member, so that the first and second end portions of the at least one flat cable can be connected to external circuits.

Preferably yet, the reverse-type cable reel structure includes at least two flat cables, and the latter are passed through the respective at least first and second reverse path channels.

Typically, the at least two flat cables are fixed at different positions of the mobile member, so that the mobile member includes at least two loci connecting to the external circuits.

Alternatively, the first reverse path channel can be closed off. In this case, only one flat cable is used.

In the prior art, the cable guide is formed into the shape of C, and the slit portion in C-shape serves as the point where the flat cable is turned to a reverse direction. According to the present invention, the cable guide is divided into guide portions (subdivisions). The flat cable is first wound around the inner cylindrical wall of the mobile member. The guide portions are then laterally mounted onto the flat cable from the side of the cable reel, instead of from above as practiced in the past. The flat cable can thus be passed through the reverse path channels without difficulty. In other words, the flat cable is no longer inserted from above into the reverse path channel formed in the cable guide. Accordingly, the flat cable is not subjected to deformation or damage. Moreover, the flat cable and the cable guide can be assembled in a more restricted space than in the past.

In a preferred embodiment, two guide portions are prepared so as to form two reverse path channels. Two flat cables are then prepared and passed through the respective reverse path channels. In such a case, each of the two flat cables is first wound in the radially inner enclosure, and then wound inversely in the radially outer enclosure.

Alternatively, the guide portions can be mounted so as to form a single reverse path channel. The structure then resembles the C-shaped cable guide of the prior art, and only one flat cable is used.

When only one flat cable is used for containing many circuits, its width and height must be increased accordingly. Conversely, when two flat cables are used, an increased number of circuits can be handled with ease. For instance, the width of one flat cable can be kept narrow.

Besides, as already mentioned, the use of a reverse-type cable reel allows the length of each flat cable to be shortened. For this reason, a greater number of circuits can now be connected to a flat cable. The cable reel structure of the present invention is well adapted to such circumstances, and is suitable for miniaturizing the entire cable reel structure.

When the cable guide is divided into three guide portions, three reverse path channels may be formed and three flat cables may be used in a single cable reel structure. Consequently, the number of circuits can further be increased.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1A:
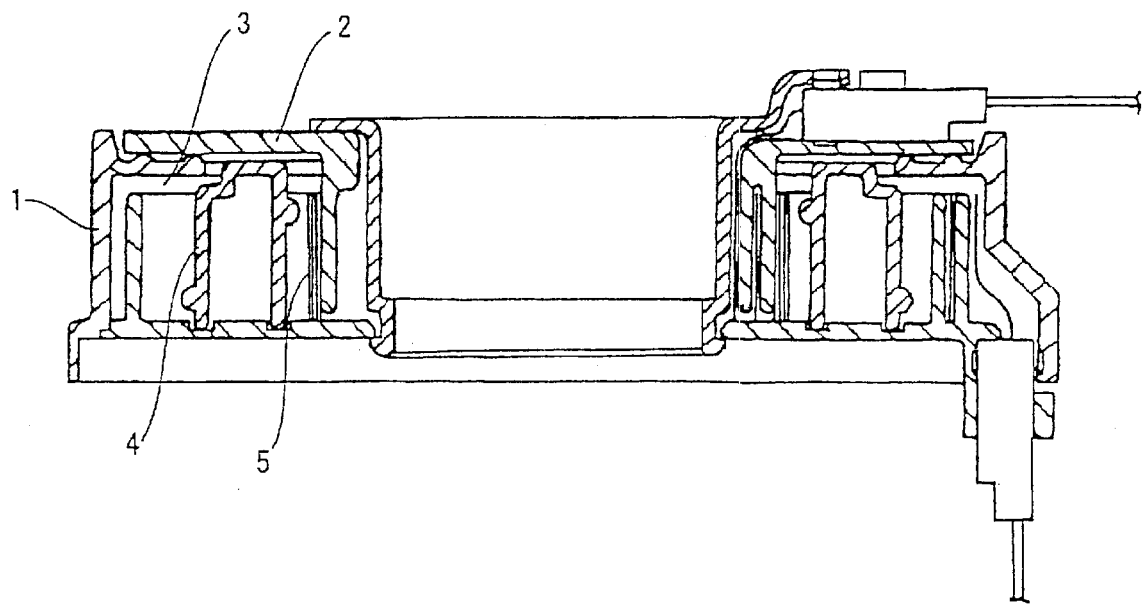
FIG. 1A is a cross-sectional side view of a cable reel according to the prior art.
Figure 1B:
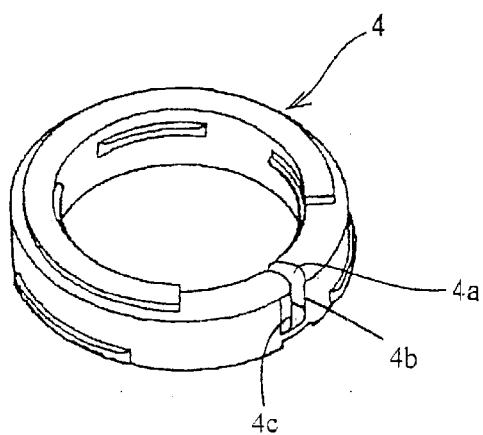
FIG. 1B is a perspective view of a cable guide contained in the cable reel of FIG. 1A.
Figure 2:
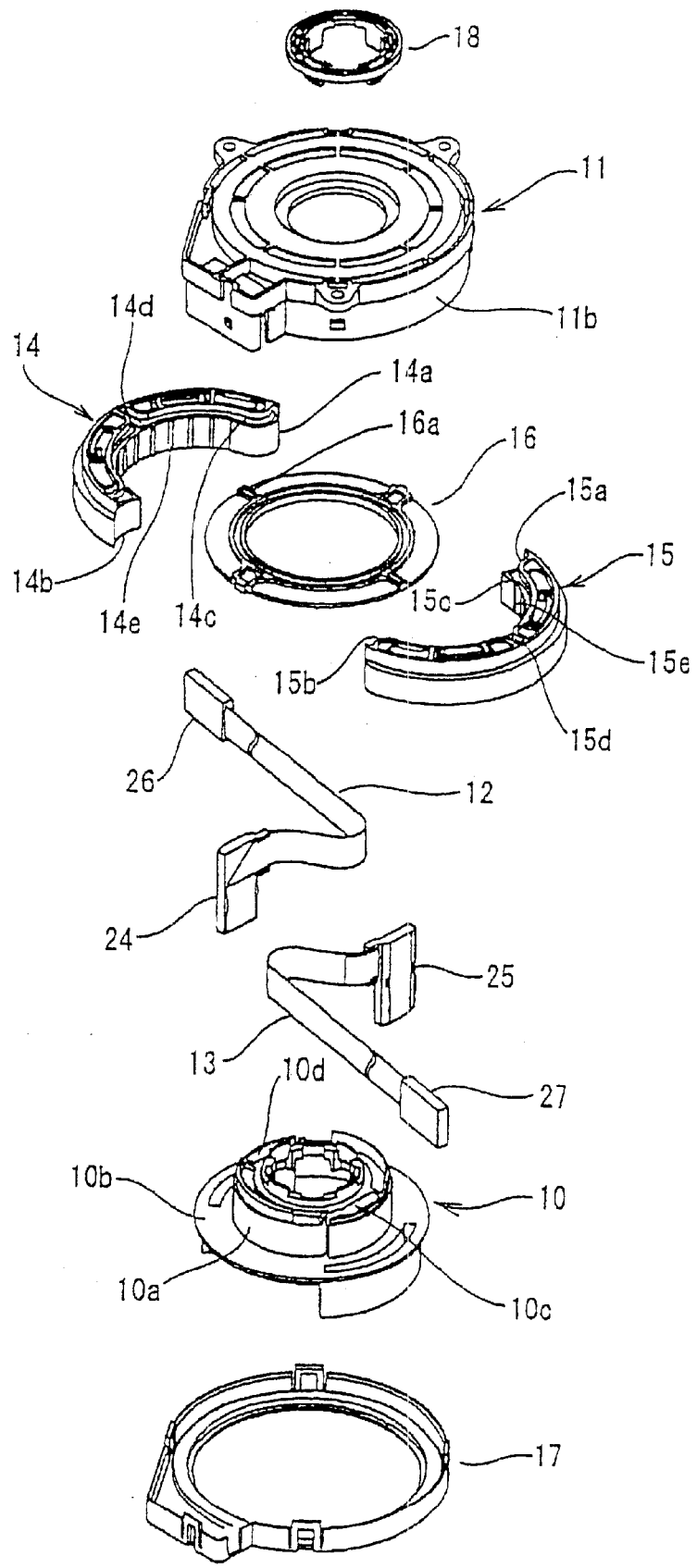
FIG. 2 is an exploded perspective view of the component parts of a cable reel structure of the present invention.

In the exploded perspective view of the component parts of the cable reel structure shown in FIG. 2, a mobile member 10 i.e., a rotor includes an inner cylindrical wall 10a and a mobile guard portion 10b projecting therefrom in a radial direction. A fixed member 11 i.e., a stator includes a fixed guard portion 11a (FIG. 3) and an outer cylindrical wall 11b rising therefrom.

In FIG. 2, the mobile member 10 and the fixed member 11 are respectively presented upside down, with respect to their normal use position.

There are also provided first and second flat cables 12 and 13, a cable guide divided into first and second guide portions 14 and 15, which respectively have a complementary half torus shape, a guide base 16 having a substantially disk-like shape, a mobile member cover 17, and a locking ring 18 for fixing the mobile member 10 to a steering shaft.

Figure 3:
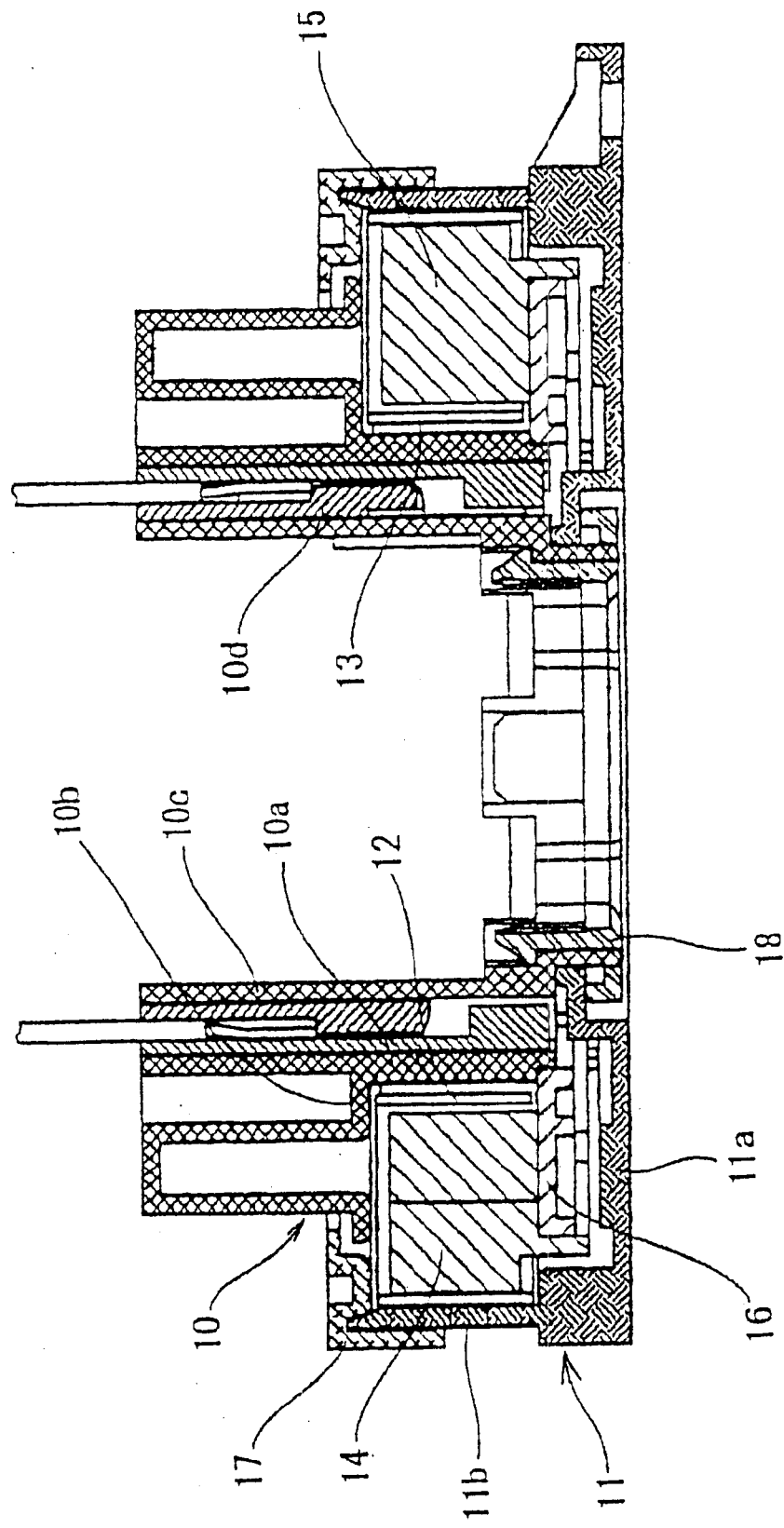
FIG. 3 is a cross-sectional side view of an assembled cable reel structure of the invention.
Figure 4:
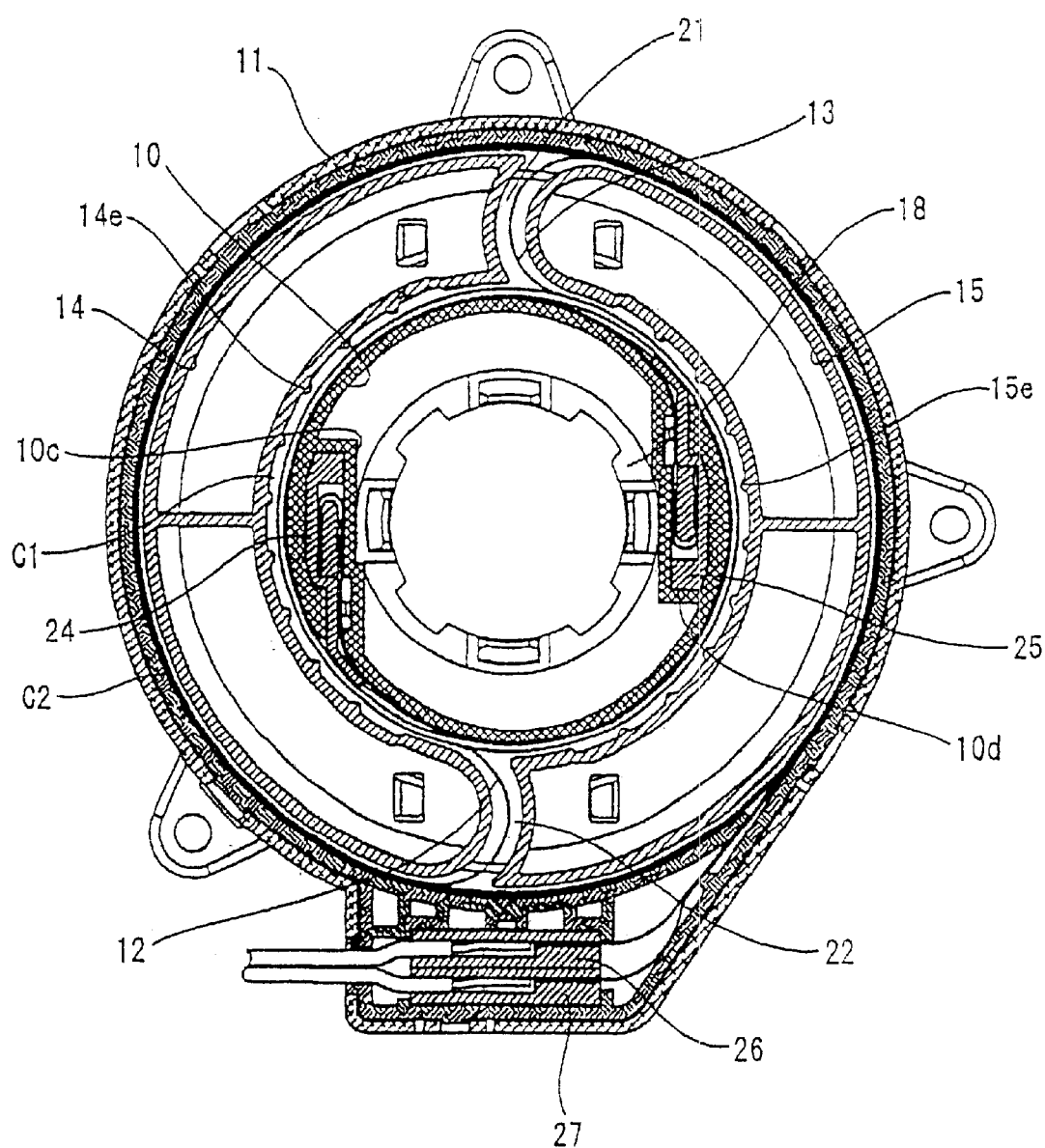
FIG. 4 is a top plan view of the assembled cable reel structure of FIG. 3.

As in a known cable reel, the mobile member 10 includes an inner cylindrical wall and a top guard, while the fixed member 11 includes an outer cylindrical wall and a bottom guard. As shown in FIGS. 3 and 4, the mobile member 10 is mounted onto the fixed member 11 in a freely rotatable manner, so as to provide a cable enclosure 20 having a torus shape. The cable enclosure 20 is then made to contain first and second guide portions 14 and 15. Accordingly, when the first and second guide portions 14 and 15 are fitted into the cable reel structure, the guide portions 14 and 15 define a radially inner enclosure C1 together with the inner cylindrical wall of the mobile member 10, and a radially outer enclosure C2 together with the outer cylindrical wall of the fixed member 11 (see FIG. 4). Further, the first and second guide portions 14 and 15 form first and second reverse path channels 21 and 22. The radially inner enclosure C1 contains first and second flat cables respectively designated 12 and 13 in a given spiraled state. They are then passed respectively through the corresponding reverse path channels 21 and 22, from the radially inner enclosure C1 into the radially outer enclosure C2, then U-turned, and spiraled in the radially outer enclosure C2 in a direction opposite to that of the spiral direction in the radially inner enclosure C1.

A first end of each of the flat cables 12 and 13 is embedded in a respective first adapter case 24, 25, in which the conductor elements of each of the flat cables are welded to corresponding bus bars and molded. The first adapter cases 24 and 25 are fitted into corresponding first slots 10c and 10d, which are provided in the radially inner side of the inner cylindrical wall 10a of the mobile member 10 at substantially opposed positions. A second end of each of the flat cables 12 and 13 is embedded in a respective second adapter case 26, 27, in which the conductor elements of each of the flat cables are welded to corresponding bus bars and molded such as to yield bared bus bar tips. The second adapter cases 26 and 27 are fitted within protrusions which are provided on the outer cylindrical wall 11b of the fixed member 11. The bared bus bar tips can thus be connected to external electrical cables.

The first and second guide portions 14 and 15 have respectively complementary half torus shapes, so that, when combined, they form a torus-like body with two respective dividing edges. One dividing edge of the first guide portion 14 is configured into a protruding arch shape 14a, around which the first flat cable is turned. Then, the corresponding dividing edge of the second guide portion 15, placed on the other side of the reverse path channel 21, is configured into a complementary recessed arch shape 15a. Likewise, the other dividing edge of the first guide portion 14 is configured into a recessing arch shape 14b. Then, the corresponding dividing edge of the second guide portion 15a, placed on the other side of the reverse path channel 22, is configured into a complementary protruding arch shape 15b, around which the second flat cable is turned.

The first and second guide portions 14 and 15 include respectively inner and outer semicircular faces and top and bottom arched faces. The respective inner semicircular faces are then provided with corresponding semicircular grooves 14c and 15c extending therealong and joining the respective outer semicircular faces (see FIG. 2). The respective top arched faces are also provided with corresponding crossing recesses 14d and 15d (FIG. 2), so that the latter can be fitted with protrusions 16a formed on the guide base 16. Further, the respective inner semicircular faces of the first and second guide portions 14 and 15 are provided with linear ribs 14e and 15e which are aligned along an axial direction thereof at a given circumferential interval.

Figure 5:
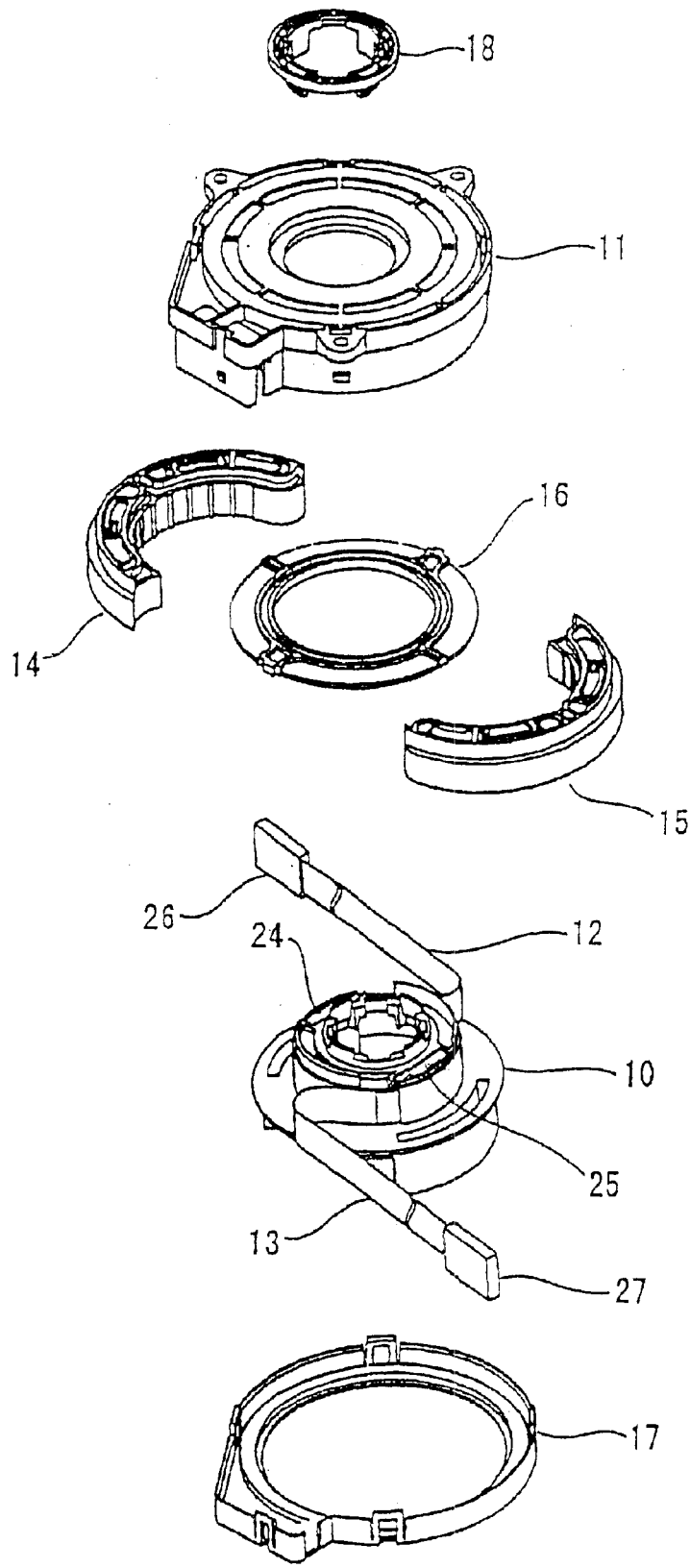
FIG. 5 is an exploded perspective view of the component parts of the inventive cable reel structure showing how they are assembled.

All the component parts mentioned above are assembled as follows. As shown in FIG. 5, the first adapter cases 24 and 25 fixed with the first and second flat cables 12 and 13 are fitted into the first slots 10c and 10d provided on the radially opposed sides of the mobile member 10 (see FIG. 2). The first and second flat cables 12 and 13 are wound around the inner cylindrical wall 10a, U-turned, and then fixed temporarily in this state.

Figure 6:
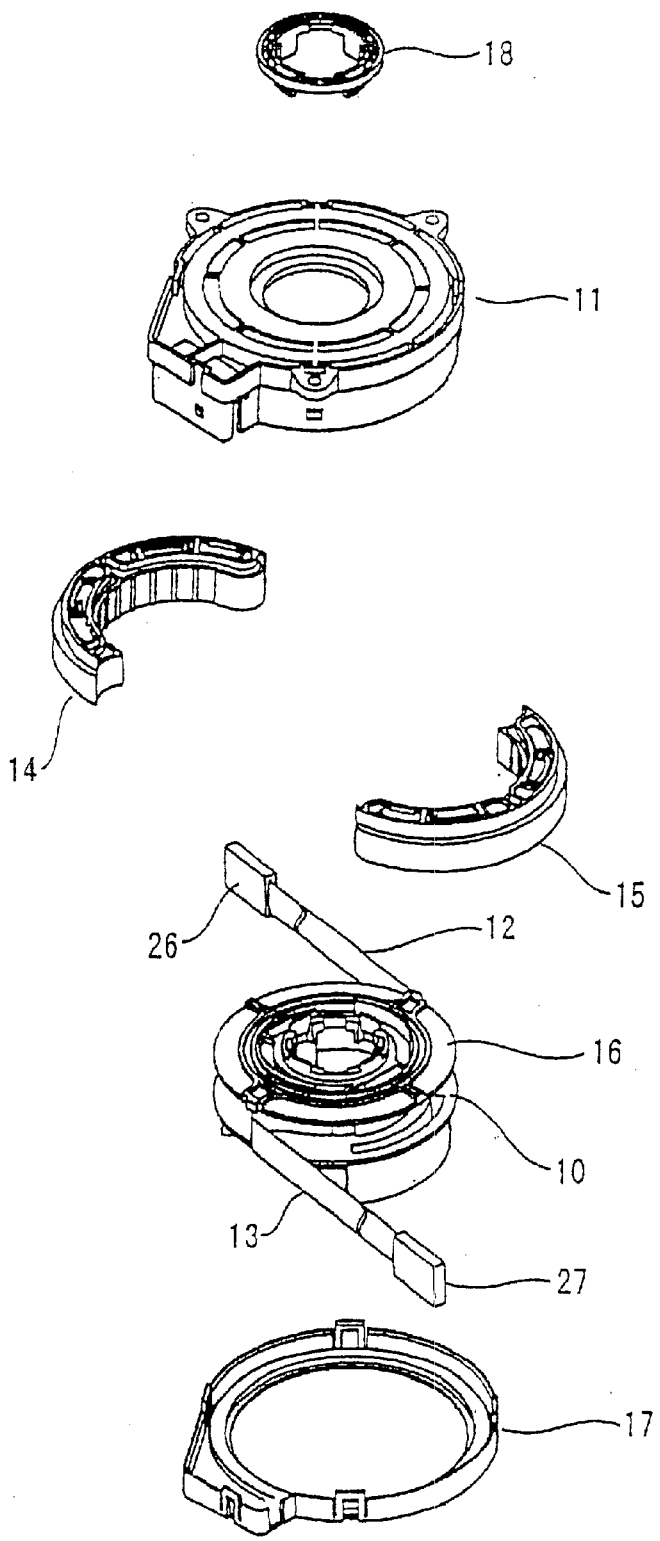
FIG. 6 is an exploded perspective view of the component parts of the inventive cable reel structure, showing when the guide base of a cable guide is being mounted onto flat cables wound around a mobile member.

As shown in FIG. 6, the guide base 16 is mounted into the mobile member 10, so that the inner circular face of the guide base 16 fits around the inner cylindrical wall 10a of the mobile member 10. In this condition, the flat cables 12 and 13 are flanked by the guide base 16 and the mobile guard. Then, the first and second guide portions 14 and 15 are mounted laterally around the flat cables 12 and 13, so as to contain the latter 12 and 13 along the inner cylindrical wall 10a of the mobile member 10. In this manner, the reverse path channels 21 and 22 are formed between the first and second guide portions 14 and 15a, and through these channels 21 and 22 are drawn out the corresponding first and second flat cables 12 and 13. When the first and second guide portions 14 and 15 are mounted, their semicircular channels 14c and 15c are fitted with the outer circular end of the guide base 16, while the protrusions 16a of the guide base 16 are fitted into the crossing recess 14d and 15d.

Figure 7:
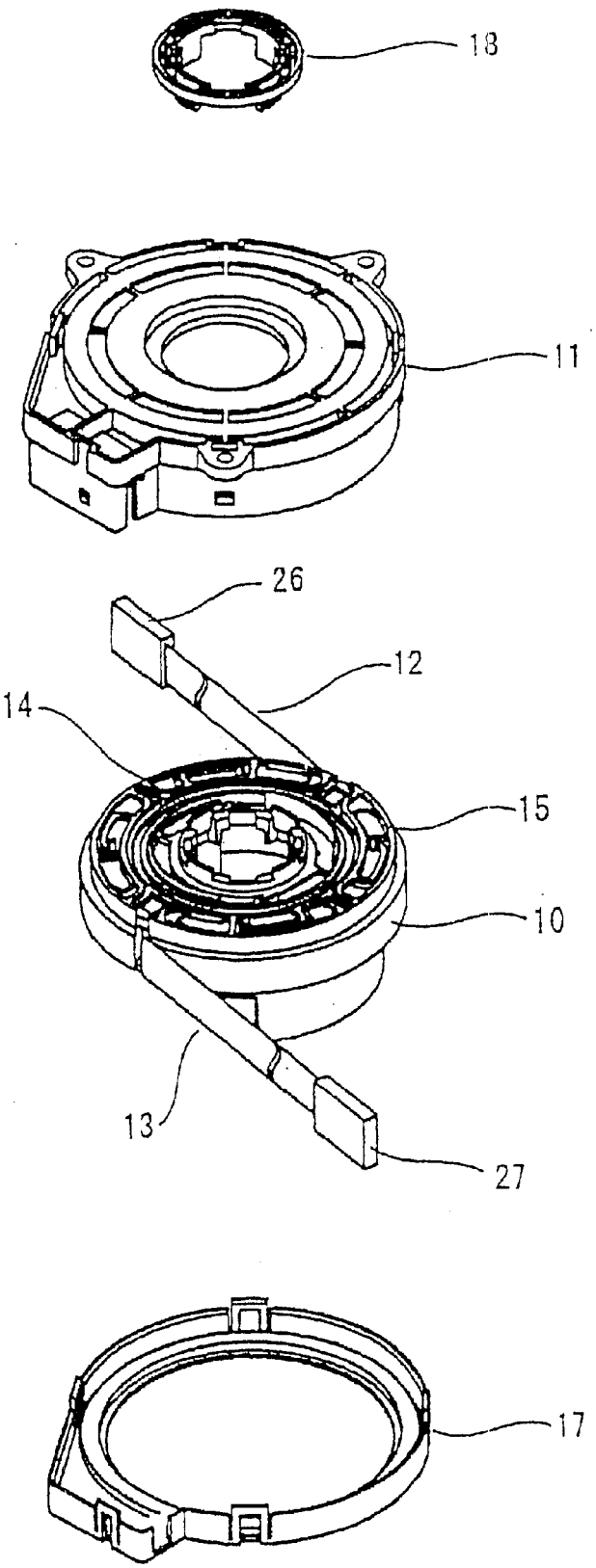
FIG. 7 is an exploded perspective view of the component parts of the inventive cable reel structure, showing when sub-guide portions are further mounted around the mobile member.
Figure 8:
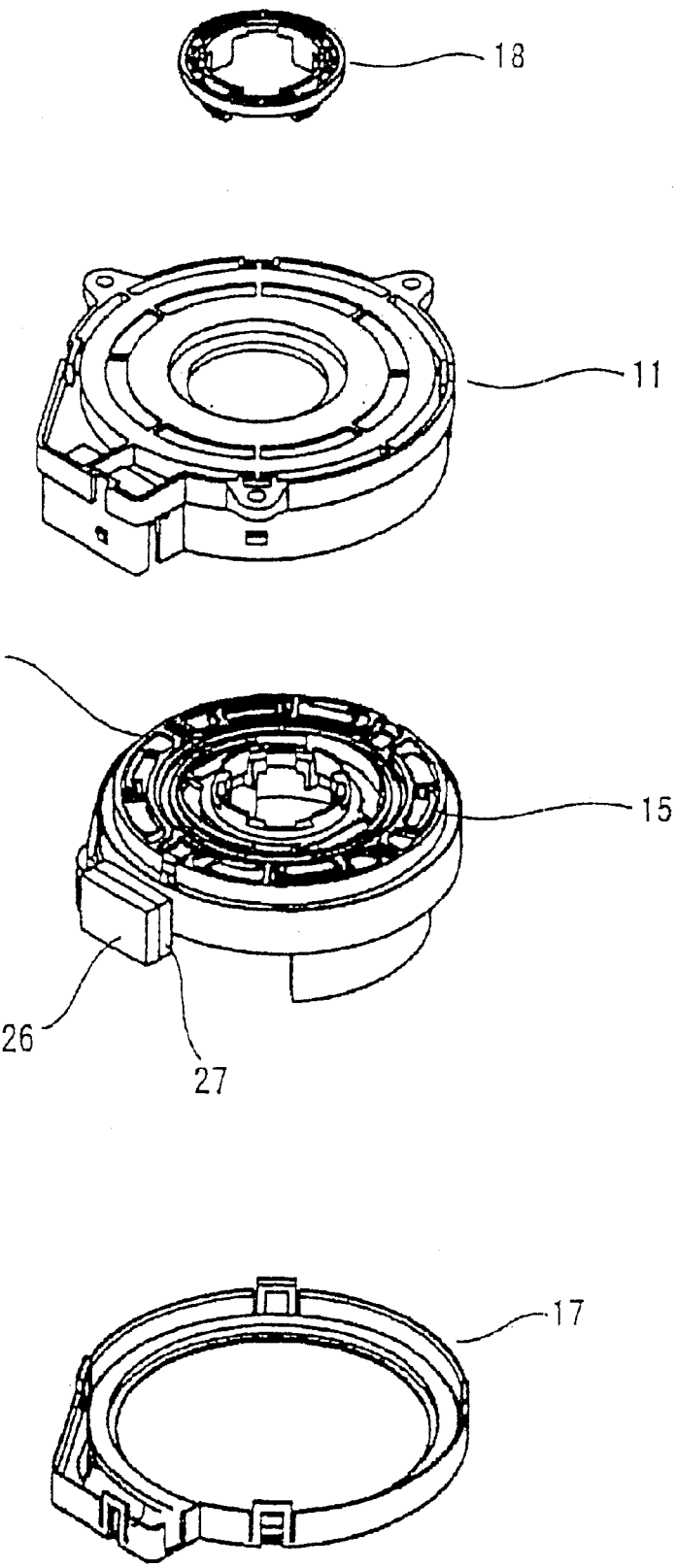
FIG. 8 is an exploded perspective view of the component parts of the inventive cable reel structure, showing when flat cables are fixed over the mobile member.
Figure 9:
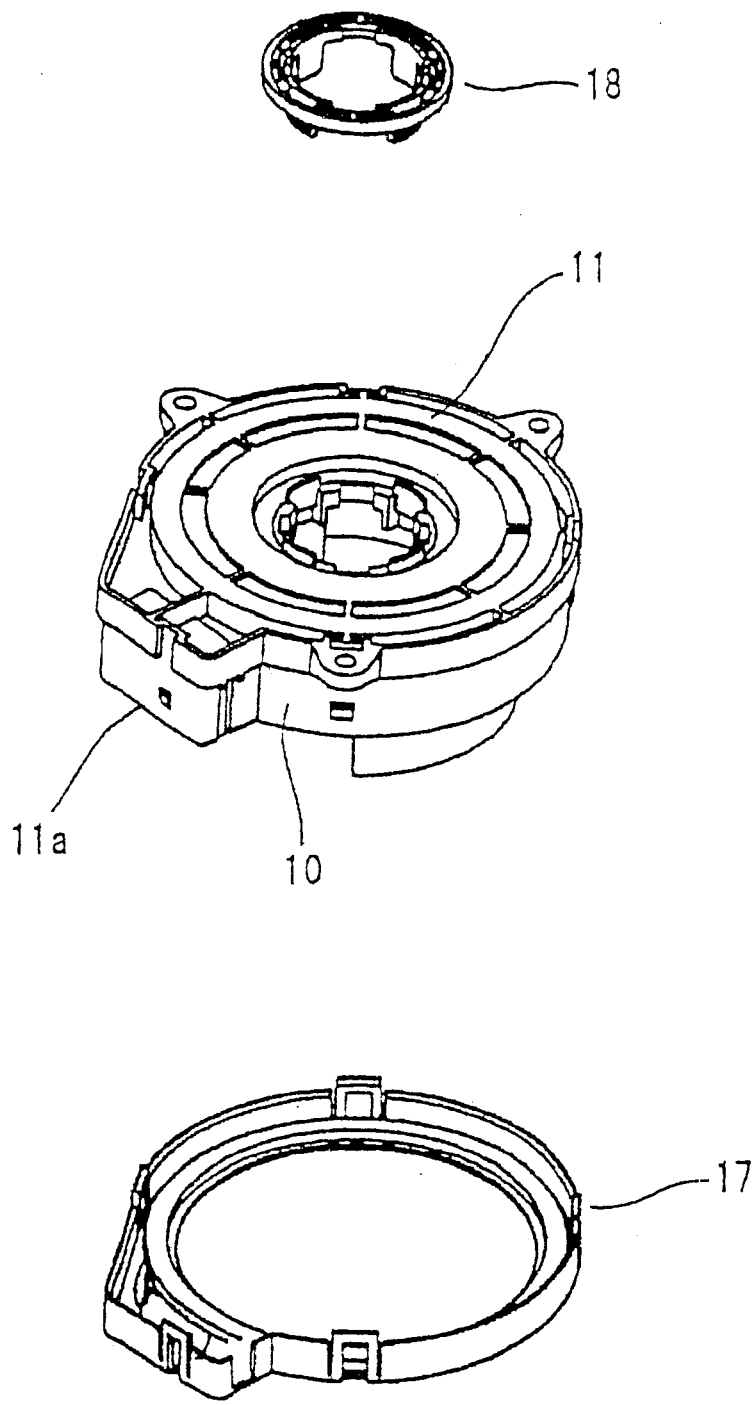
FIG. 9 is an exploded perspective view of the component parts of the inventive cable reel structure, showing when a fixed member is mounted onto the mobile member.
Figure 10:
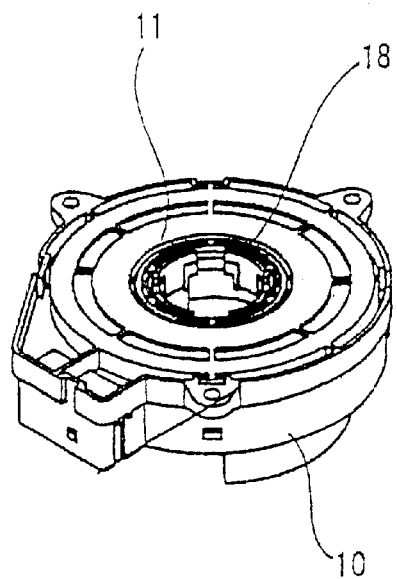
FIG. 10 is an exploded perspective view of the component parts of the inventive cable reel structure, showing when a locking ring is fitted through the fixed and mobile members.
Figure 10:
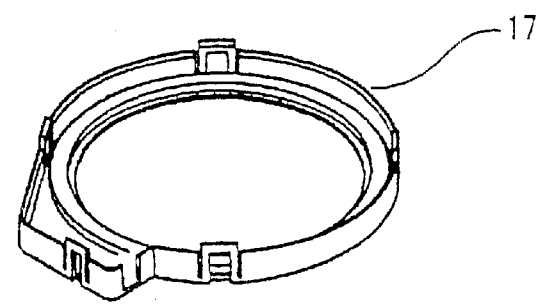
Figure 11:
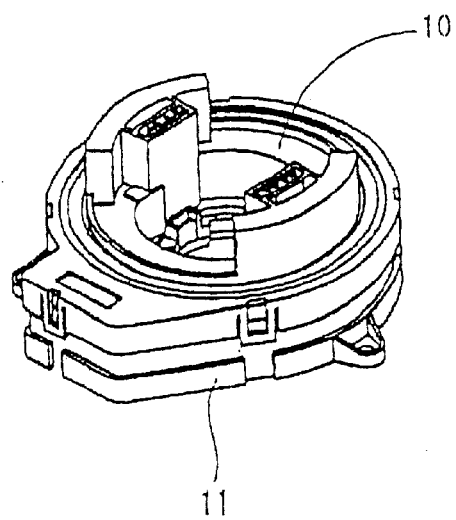
FIG. 11 is a perspective view of the inventive cable reel structure when it is completely assembled.

As shown consecutively in FIGS. 7 and 8, the first and second flat cables 12 and 13 are drawn out from the respective reverse path channels 21 and 22, and turned around the outer semicircular faces of the first and second guide portions 14 and 15 in the same direction (counterclockwise in FIG. 7). The fixed member 11 is then mounted as shown consecutively in FIGS. 8 and 9, and the cover 17 and the locking ring 18 are mounted as shown consecutively in FIGS. 9 and 10. Thereafter, the assembled structure is turned upside down to obtain the cable reel structure of the invention shown in FIG. 11.

As mentioned above, a cable guide is divided into two semicircular guide portions 14 and 15, and mounted laterally around flat cables 12 and 13, which are in turn wound around a mobile member 11. The semicircular guide portions 14 and 15 thus form reverse path channels 21 and 22, through which the flat cables 12 and 13 are passed and U-turned. In this manner, the flat cables are no longer inserted from above a cable guide into reverse path channels formed therein, as has been practiced in the past. Accordingly, there is no risk of deforming or damaging the flat cables. Moreover, assembly operations are made easier and better adapted to assemblage by automation.

Further, when the divided guide portions are made into symmetrical forms, all that is required is to prepare only one shape of guide portions, and thus only one shape of molds. The costs needed for manufacturing molds can thus be reduced.

Figure 12:
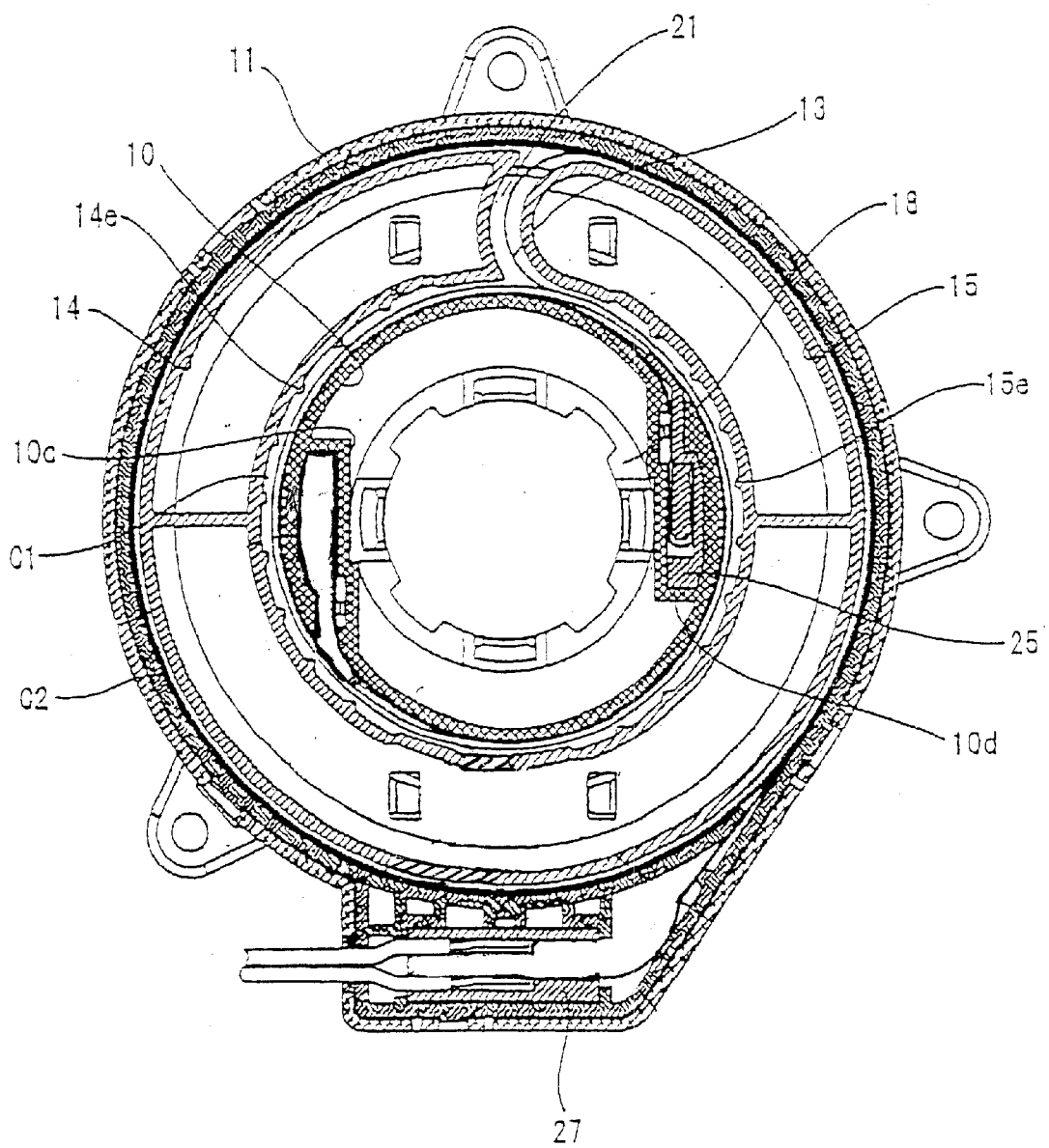
FIG. 12 is a top plan view of an assembled cable reel structure of a second embodiment of the present invention.

In the above embodiments, two flat cables are drawn out through corresponding reverse path channels provided between a pair of divided cable guide portions, and U-turned at the exits of the reverse path channels. However, the divided guide portions may include one end closed and the other end opened, so that the cable guide forms only one reverse path channel, and one flat cable is used, as shown in FIG. 12.

As can be understood from the foregoing explanation, the reverse-type cable reel structure of the invention includes divided cable guides, which form reverse path channels. Each of the flat cables is wound in a given direction in a zone between the mobile member and the cable guide, passed through a reverse path channel, and then turned around towards the reverse direction in a zone between the cable guide and the fixed member. After the flat cables are wound around the inner cylindrical face of the mobile member, the divided cable guides are mounted around the flat cables from sideways. The flat cables are thus no longer fitted into the reverse path channels from above the cable guide, thereby avoiding damage or deformation of the flat cables.

Further, handling of the flat cables is greatly simplified, and requires no skill for assembly work. Such a cable reel structure is well suited to automatic assembling by mechanical means.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Patent Application No. 2000-160832, filed on May 30, 2000, which is herein expressly incorporated by reference in its entirety.

What is claimed:

1. A reverse-type cable reel structure configured to contain at least one flat cable, said cable reel comprising:

a cable guide with at least one reverse path channel, said cable guide partitioning said cable reel structure into a radially inner enclosure and a radially outer enclosure, said at least one flat cable being first wound in said radially inner enclosure in a given winding direction, passed through said at least one reverse path channel, inversely turned at the exit thereof, and wound in said radially outer enclosure in a direction opposite to said given winding direction;

said cable guide being divided into at least first and second separate and complementary guide portions, thereby forming at least first and second reverse path channels, such that said separate and complementary guide portions are laterally mountable into engagement with said at least one flat cable after said at least one flat cable has been wound in said radially inner enclosure.

2. The cable reel structure according to claim 1, further comprising a fixed member including an outer cylindrical wall and a mobile member including an inner cylindrical wall, said mobile member being freely rotatably mounted within said fixed member, thereby defining a cable enclosure having a torus-shaped hollow portion, said cable enclosure containing said cable guide having a ring shape, said cable guide partitions said cable enclosure into said radially inner and external enclosures communicating therebetween through said first and second reverse path channels, and said at least one flat cable has a first end portion fixed to said mobile member and a second end portion fixed to said fixed member, so that said first and second end portions of said at least one flat cable can be connected to external circuits.

3. The cable reel structure according to claim 2, wherein said reverse-type cable reel structure comprises at least two flat cables, said cables being passed through respective ones of said at least first and second reverse path channels.

4. The cable reel structure according to claim 3, wherein said at least two flat cables are fixed at different positions of said mobile member, so that said mobile member comprises at least two loci connecting to said external circuits.

5. The cable reel structure according to claim 2, wherein said first reverse path channel is closed off and only one flat cable is used.

6. The cable reel structure according to claim 1, wherein said reverse-type cable reel structure comprises at least two flat cables, said cables being passed through respective ones of said at least first and second reverse path channels.

7. The cable reel structure according to claim 6, wherein said at least two flat cables are fixed at different positions of said mobile member, so that said mobile member comprises at least two loci connecting to said external circuits.

8. The cable reel structure according to claim 1, wherein said first reverse path channel is closed off and only one flat cable is used.

* * * * *